United States Patent [19]

Omori et al.

[11] 4,399,727
[45] Aug. 23, 1983

[54] DRUM SHEAR

[75] Inventors: Shunji Omori; Kanji Hayashi; Yukio Hiasa; Nobutaka Maeda; Shoichi Hashimoto; Hiroki Yoshiya, all of Hiroshima, Japan

[73] Assignee: Mitsubishi Jukogyo Kabushiki Kaisha, Tokyo, Japan

[21] Appl. No.: 228,699

[22] Filed: Jan. 26, 1981

[30] Foreign Application Priority Data

Feb. 20, 1980 [JP] Japan .................................. 55-19886

[51] Int. Cl.³ .............................................. B23D 25/12
[52] U.S. Cl. ........................................... 83/345; 83/37
[58] Field of Search ..................... 83/37, 342, 343, 345

[56] References Cited

U.S. PATENT DOCUMENTS

| 1,680,048 | 8/1928 | Iversen | 83/37 |
| 3,000,250 | 9/1961 | Altman et al. | 83/345 X |
| 3,068,731 | 12/1962 | Schultz et al. | 83/342 X |
| 3,431,830 | 3/1969 | Stovall | 83/343 X |
| 4,202,230 | 5/1980 | Obinata | 83/345 |

Primary Examiner—James M. Meister
Attorney, Agent, or Firm—Wenderoth, Lind & Ponack

[57] ABSTRACT

A drum type shear includes a pair of rotatable drums, each drum including a shearing blade. The circumferential velocity of the outer edge of a first blade is greater than the circumferential velocity of the outer edge of a second blade, such that upon rotation of the drums with a workpiece passing therebetween, after the workpiece has been initially bitten between the blades, shearing of the workpiece is completed while the outer edge of the first blade overtakes the outer edge of the second blade.

3 Claims, 19 Drawing Figures

FIG. 11
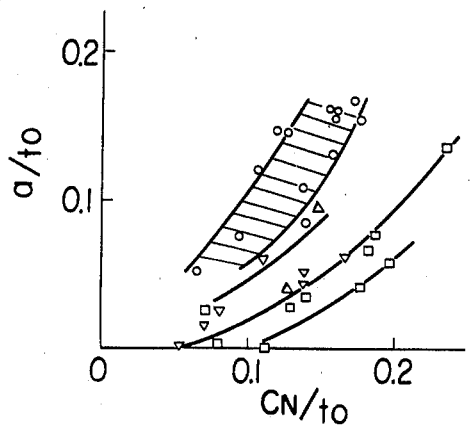
FIG. 12
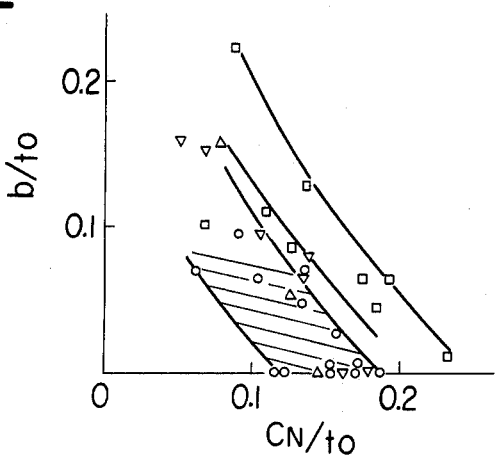
FIG. 13
| SYMBOL | $R_U/R_L$ |
|---|---|
| ○ | 0.998 |
| △ | 1.024 |
| ▽ | 1.047 |
| □ | 1.074 |

DRUM SHEAR

BACKGROUND OF THE INVENTION

The present invention relates to an improved drum type shear, such as a crop or trimming shear disposed between a rough rolling mill group and a finish rolling mill for shearing off faulty or incomplete end portions, for example such end portions at the leading and trailing edges, of a rolled workpiece to prevent damage in the finish rolling mill in a hot strip mill installation.

In a hot strip mill installation, it has been common practice, for the purpose of preventing damage in a finish rolling mill, that just prior to finishing a rolled workpiece, for example a sheet bar, the leading and trailing ends of the workpiece are regularly sheared at right angles to the direction of travel of the workpiece along a working line by means of a traveling shear, to remove such faulty or incomplete end portions. As such traveling shear, a drum type shear has been commonly employed.

Such a drum type shear is shown in FIGS. 1 and 2, which illustrate a workpiece sheet bar 1 traveling in the direction indicated by the arrow. The workpiece is bitten between an upper blade 3 and a lower blade 5 detachably mounted on a rotating upper drum 2 and a rotating lower drum 4, respectively. By such action there is sheared from each of the leading and trailing ends of the workpiece 1 a crop portion or end cut plate 1'. The prior art drum shear of this type provides that the upper and lower drums 2 and 4 rotate at the same rotational angular velocity, and that the radial distance $r_1$, between the rotational axis of drum 2 and the outer edge of blade 3, is equal to the radial distance $r_2$, between the rotational axis of drum 4 and the outer edge of blade 5.

In recent times however, shearing conditions have become more severe such that the workpiece temperature is lowered. This is due to the fact that there is a trend towards shortening the length of a sheared crop portion from approximately 200–300 mm to approximately 30–100 mm, for the contemplated purpose of lowering costs by increasing the rolling yield, and that direct rolling is employed for the purpose of saving energy. As a result, occurrences of accidents and damage have become more frequent in that the crop portion 1' cannot be sheared off perfectly, but sometimes enters the finish rolling mill with the workpiece 1, with the result that the rolls of the rolling mill are damaged or the workpiece is scratched, thereby lowering the commercial value of the product.

It has been discovered that the occurrence of the above-mentioned type of faulty shearing arises more frequently with respect to a tail cut, i.e. shearing of the trailing end, then with respect to a top cut, i.e. shearing of a leading end. This phenomenon is illustrated in FIGS. 3(a) and 3(b) which show the conditions just prior to completion of shearing, the condition of a top cut being illustrated in FIG. 3(a), and the condition of a tail cut being illustrated in FIG. 3(b). These figures make it apparent that when carrying out a shearing operation by means of a drum type shear, a workpiece 1 is subjected both to a shearing force and to a bending force by the actions of upper blade 3 and lower blade 5. As a result, the cropped portion 1' is bent at a particular angle with respect to the direction of travel of the workpiece along the working line while it is being sheared. In the case of the top cut, as illustrated in FIG. 3(a), a left surface 6 of lower blade 5 is inclined leftwardly by an angle $\beta_1$ with respect to a verticle plane, and thereby the lower blade 5 to some degree acts to reduce or counteract the bending force imparted to the crop portion 1'. On the other hand, in the case of the tail cut, as illustrated in FIG. 3(b), the right surface 7 of upper blade 3 is inclined leftwardly by an angle $\beta_1$ with respect to a vertical plane, and therefore the upper blade 3 has much less of an effect of preventing or counteracting the bending force imparted to crop portion 1'. It will be apparent from a comparison of FIGS. 3(a) and 3(b) that the angle $\alpha_2$ at which the trailing end crop portion is bent will be substantially larger than the angle $\alpha_1$ at which the leading end crop portion is bent, during respective shearing operations. From the results of practical use on an actual machine, as well as from experiments, it has been determined that, all other operating conditions being equal, the larger is the bending angle $\alpha$ of the respective crop portion with regard to the direction of movement of the workpiece, the higher will be the occurrence of faulty or incomplete shearing.

SUMMARY OF THE INVENTION

With the above discussion in mind, it is one object of the present invention to provide a novel drum type shear with which the occurrence of faulty shearing operations can be prevented.

It is a further object of the present invention to provide such a novel drum type shear having improved shearing capability.

As a result of extensive experiments by the present inventors, it has been determined that these objects can be achieved by the provision, in a drum shear of the type including a pair of rotatable drums, each drum including a shearing blade, and the drums being arranged such that upon rotation of the drums a workpiece passing therebetween is bitten between and sheared by the blades, of the improvement wherein after the workpiece has been initially bitten between the blades, shearing of the workpiece is completed while the outer edge of a first blade overtakes the outer edge of a second blade, as measured by the direction of the workpiece, i.e. whereby one blade overtakes the other blade during the completion of the shearing operation.

According to one feature of the present invention, the circumferential velocity of the outer edge of a first blade is greater than the circumferential velocity of the outer edge of a second blade. This enables the arrangement that the outer edge of the first blade overtakes the outer edge of the second blade during the shearing operation.

According to one arrangement of the present invention, the two drums rotate at equal angular velocities, and a first radial distance between the outer edge of the first blade and the rotational axis of the respective first drum thereof is greater than a second radial distance between the outer edge of the second blade and the rotational axis of the respective second drum thereof.

In accordance with yet a further arrangement of the present invention, the first radial distance between the outer edge of the first blade and the rotational axis of the respective first drum is equal to the second radial distance between the outer edge of the second blade and the rotational axis of the respective second drum, but the rotational angular velocity of the first drum is greater than the rotational angular velocity of the second drum.

BRIEF DESCRIPTION OF THE DRAWINGS

The above and other objects, features and advantages of the present invention will become more apparent from the following detailed description of preferred embodiments of the present invention, taken with reference to the accompanying drawings, wherein:

FIGS. 9 and 11-15 are graphs illustrating results of experimental data emphasizing the effectiveness of the drum type shear according to the present invention.

DETAILED DESCRIPTION OF THE INVENTION

Figure 4:
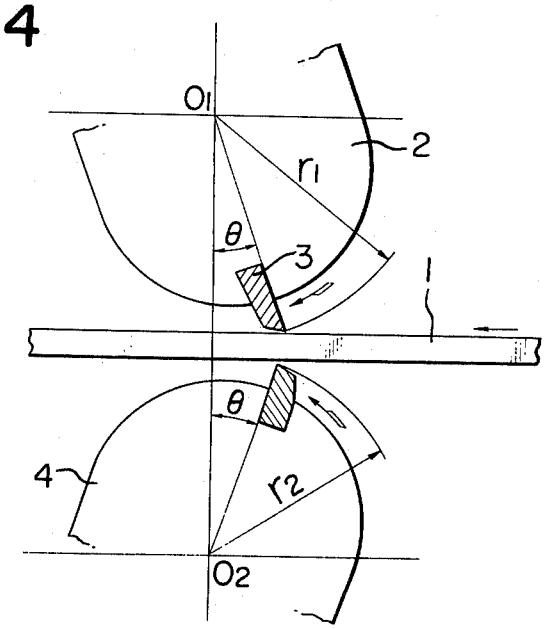
FIG. 4 is a schematic view illustrating the operating principle of a first preferred embodiment of a drum type shear according to the present invention.

With reference now to FIG. 4 of the drawings, a first preferred embodiment of the present invention will be described in detail. Thus, an upper rotating drum 2 has removably mounted therein an upper shearing blade 3, with a radial distance $r_1$ between the outer edge of blade 3 and the center of rotation $O_1$ of drum 2. Similarly, a lower rotatable blade 4 has removably mounted therein a lower shearing blade 5, with the radial distance $r_2$ between the outer edge of blade 5 and the center of rotation $O_2$ of drum 4. A workpiece 1, such as a sheet bar, is fed in the direction indicated by the arrow along a path midway between the two drums. The radial distances $r_1$ and $r_2$ are selected to fill the conditions that $r_1 > r_2$ and furthermore the condition that $r_1/r_2 = 1.02-1.2$. Also, the rotational angular velocities of rotation of the drums 2 and 4, and thus of the blades 3 and 5, are equal. Since the rotational angular velocities of blades 3 and 5 are equal, but since $r_1$ is greater than $r_2$, the outer edge of blade 3 will have a greater circumferential velocity than the outer edge of blade 5.

With the drums 2 and 4 rotating in the directions indicated by the arrows in FIG. 4 to shear the workpiece 1, the outer edge of upper blade 3 will first make contact with the workpiece 1 due to the fact that $r_1$ is greater than $r_2$. However, at this moment shearing is not effected because the lower blade 5 has not yet made contact with the workpiece 1. Contact of the blade 3 with workpiece 1 will slightly press workpiece 1 downwardly toward lower blade 5, and after the lower blade 5 makes contact with the workpiece 1, the shearing will commence.

This embodiment of the present invention will be further described with reference to FIGS. 5(a) to 5(d) in connection with the shearing of a tail cut crop portion 1' from the trailing end of the workpiece, by means of the drum type shear of FIG. 4.

Figure 1:
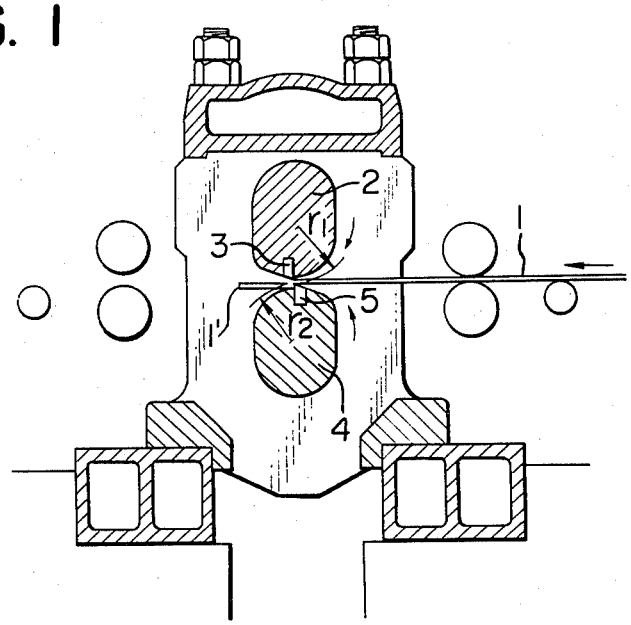
FIG. 1 is a longitudinal cross-sectional view through the center of a drum type shear, showing the general construction thereof.
Figure 2:
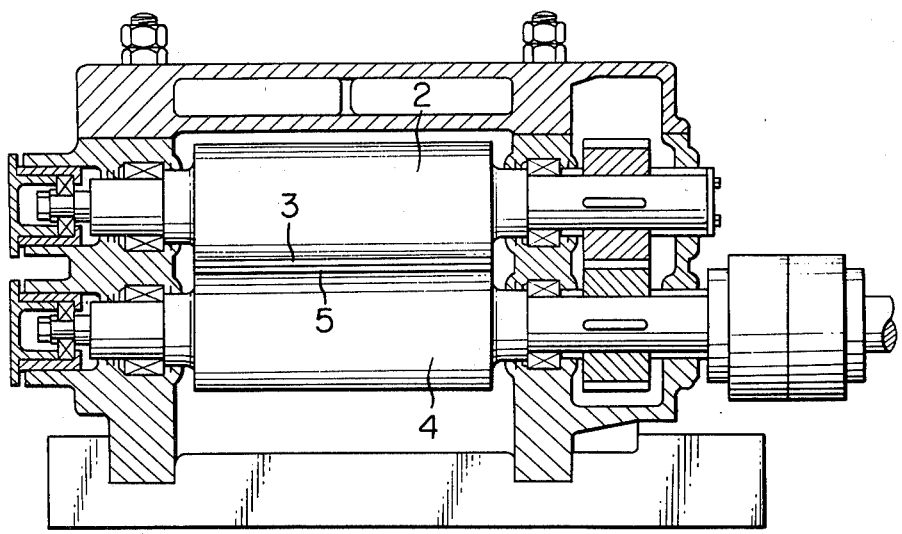
FIG. 2 is a transverse cross-sectional view of the drum type shear of FIG. 1.
Figure 3A:
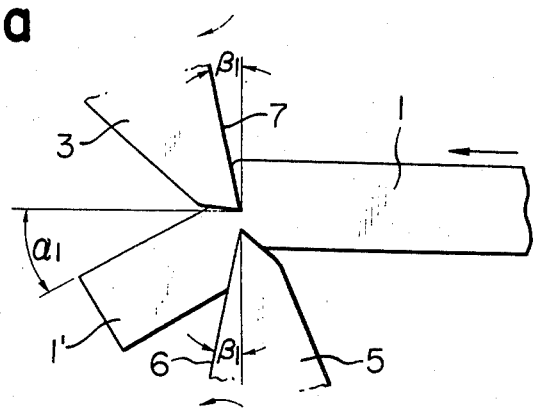
FIGS. 3(a) and 3(b) are schematic views showing the conditions just prior to completion of shearing operations by means of a prior art drum type shear, FIG. 3(a) illustrating such condition during shearing of a leading end crop portion, and FIG. 3(b) illustrating such condition during the shearing of a trailing end crop portion.
Figure 3B:
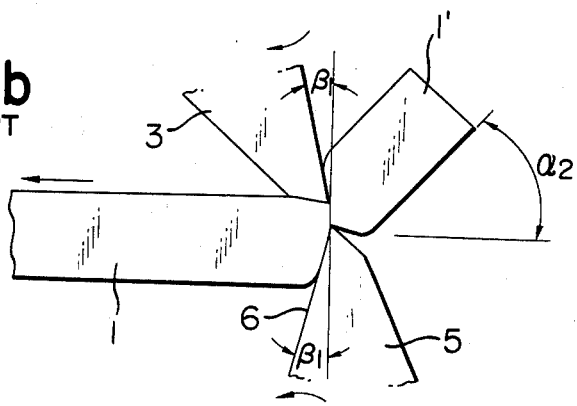
Figure 5A:
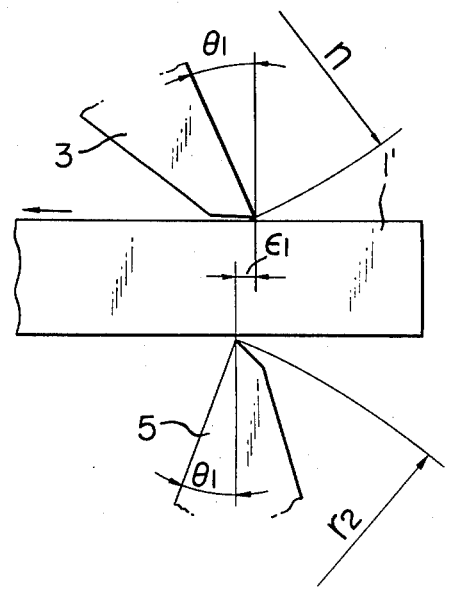
FIGS. 5(a) to 5(d) are schematic views illustrating the successive conditions during a shearing operation for shearing a trailing end crop portion by means of the drum type shear shown in FIG. 4.

Thus, FIG. 5(a) shows the condition where the outer edges of the upper and lower blades 3 and 5 have both made contact with the workpiece and shearing is to be just commenced. The angular rotational velocities of blades 3 and 5 are equal, and the angles $\theta_1$ illustrated in FIG. 5(a) are equal. However, since $r_1$ is greater than $r_2$, the outer edge of upper blade 3 will first contact the workpiece at a first longitudinal position along the direction of movement of workpiece 1, and the outer edge of lower blade 5 will first contact the workpiece 1 at a second longitudinal position along such direction of movement, with the first longitudinal position being upstream of the second longitudinal position, as illustrated in FIG. 5(a) by a distance $\epsilon_1 = (r_1 - r_2) \cdot \sin \theta_1$. Therefore, when the upper and lower blades 3 and 5 begin to shear the workpiece 1, contrary to the situation of the prior art arrangement shown in FIG. 3(b) wherein the crop portion 1' tends to be bent upwardly, in accordance with the present invention the tendency to bend the crop portion 1' upwardly is counteracted by the location of blades 3 and 5 and a force is exerted on crop portion 1' which tends to bend crop portion 1 back downwardly.

Figure 5B:
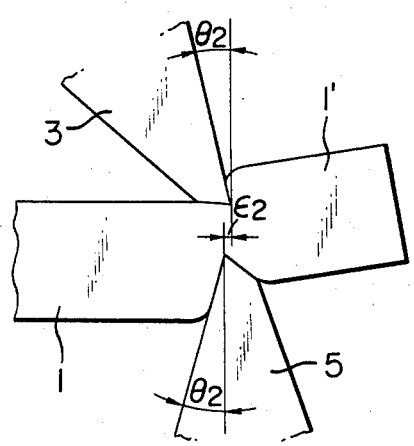
Figure 5C:
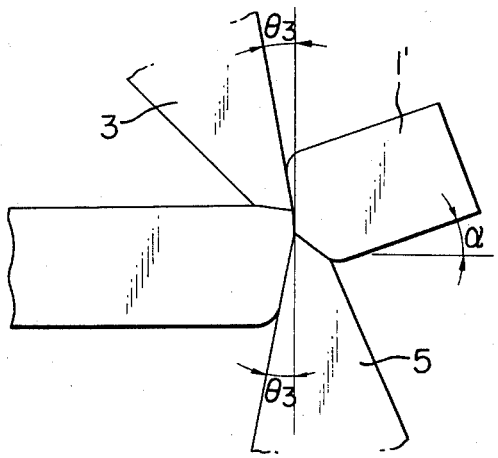
Figure 5D:
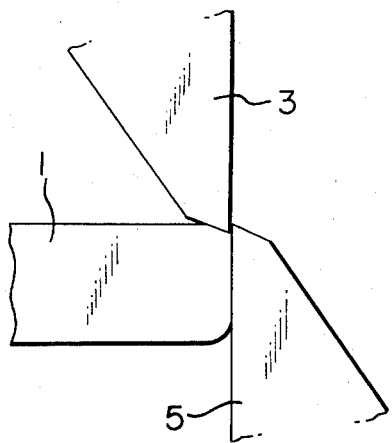

As the drums 2 and 4 continue to rotate, the relative positions between the crop portion 1' and the outer edges of the upper and lower blades 3 and 5 sequentially pass through changing conditions represented in FIGS. 5(b), 5(c) and 5(d). The crop portion 1' is almost sheared off at the position shown in FIG. 5(c), and the shearing operation is completed at the position shown in FIG. 5(d). Since the circumferential velocity of the outer edge of blade 3 is greater than the circumferential velocity of the outer edge of blade 5, during the shearing operation the outer edge of blade 3 overtakes the outer edge of blade 5, such that the longitudinal spacing $\epsilon_1$ illustrated in FIG. 5(a) progressively decreases, for example as indicated in FIG. 5(b) at $\epsilon_2$. However, since the rotational angular velocities of blades 3 and 5 remain equal, the relative angles of the shearing surfaces of the blades 3 and 5 will remain equal, through changing, as is illustrated by a comparison of $\theta_1$ shown in 5(a), $\theta_2$ in FIG. 5(b) and $\theta_3$ in FIG. 5(c). As will be apparent from FIGS. 5(a)-5(c), since the angle $\alpha$ at which the crop portion 1 is bent upwardly is quite small relative the bending angle $\alpha_2$ in the prior art arrangement shown in FIG. 3(b), faulty shearing of the trailing end crop portion 1' is prevented in accordance with the present invention.

Although not illustrated in the drawings, the drum type shear of the present invention as illustrated in FIG. 4 of the drawings may also be employed for conducting a top cut shearing operation to shear a crop portion from the leading end of the workpiece. In such an arrangement, the bending angle of the sheared crop portion will also be smaller than is the case in the prior art drum type shear illustrated in FIG. 3(a), and faulty shearing can be prevented.

Figure 6:
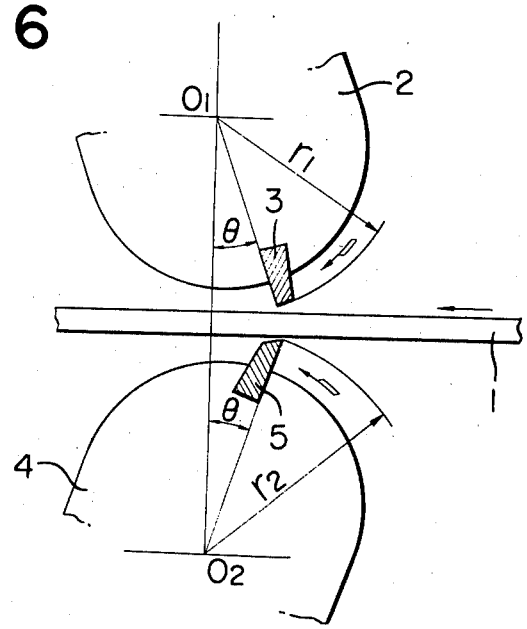
FIG. 6 is a view similar to FIG. 4 but illustrating a second preferred embodiment of a drum type shear according to the present invention.

Additionally, although the embodiment of the present invention illustrated in FIGS. 4 through 5(d) relates the condition wherein the outer edge of the upper blade 3 moves at a greater circumferential velocity than the outer edge of the lower blade 5, just the opposite may be the case. Such an arrangement is shown in FIG. 6, wherein the rotational angular velocities of the drums and blades are equal, but the circumferential velocity of the outer edge of lower blade 5 is greater than the circumferential velocity of the outer edge of upper blade 3, due to the relationships that $r_1 < r_2$ and $r_2/r_1 = 1.02-1.2$. It is believed to be apparent without further explanation that the device of FIG. 6 operates in the same manner as described above regarding the operation of the embodiment of FIG. 4, with the obvious difference being that the outer edge of lower blade 5 contacts the workpiece before the outer edge of upper blade 3.

In the embodiment of FIGS. 4 and 6, the rotational angular velocities of the blades were equal, and the relationship that the circumferential velocity of the outer edge of the first of the blades was greater than the circumferential velocity of the outer edge of a second of the blades was achieved by providing a difference in the radial distances between the outer edges of the blades and the respective rotational centers of the drums. However, the present invention is not intended to be limited to this specific structural arrangement for providing the difference in circumferential velocities.

Figure 7:
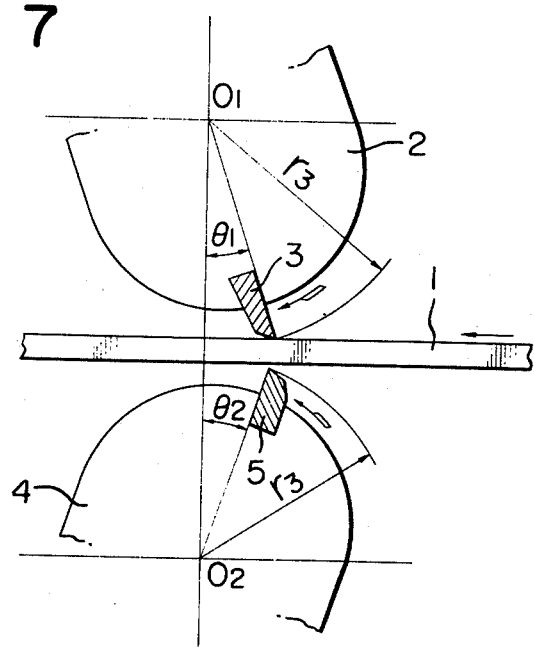
FIG. 7 is a view similar to FIGS. 4 and 6, but illustrating a third preferred embodiment of a drum type shear according to the present invention.

FIG. 7 shows a modified embodiment wherein the radial distances $r_3$ between the outer edges of blades 3 and 5 and the respective rotational centers $O_1$ and $O_2$ are equal. However, in this embodiment, the upper and lower drums 2 and 4 are driven at unequal angular velocities in different modes such that in the phase of the cycle of rotation of the drums to achieve shearing of the workpiece 1, the circumferential velocities of the outer edges of the blades 3 and 5 will be unequal. In accordance with this embodiment of the present invention, either of the drums 2 or 4 might be provided with the greater rotational angular velocity during the phase of the cycle of rotation for achieving shearing. However, in the arrangement of FIG. 7, it is upper drum 2 which has a greater rotational angular velocity in the phase of the cycle of rotation of the drums to achieve shearing. Specifically, this difference in rotational angular velocity is such that the circumferential velocity $v_1$ of upper blade 3 is greater than the circumferential velocity $v_2$ of lower blade 5 by a factor of $v_1/v_2 = 1.02-1.2$. Under such conditions, the drum type shear shown in FIG. 7 will have the same effects and advantages as the drum type shear of FIGS. 4-5(d).

A more detailed description will now be made relating to the effectiveness of the drum type shear of the present invention, with reference to FIGS. 8-13 of the drawings which illustrate the results of experiments conducted by the inventors for evaluating the shearing capabilities of blades.

Figure 9:
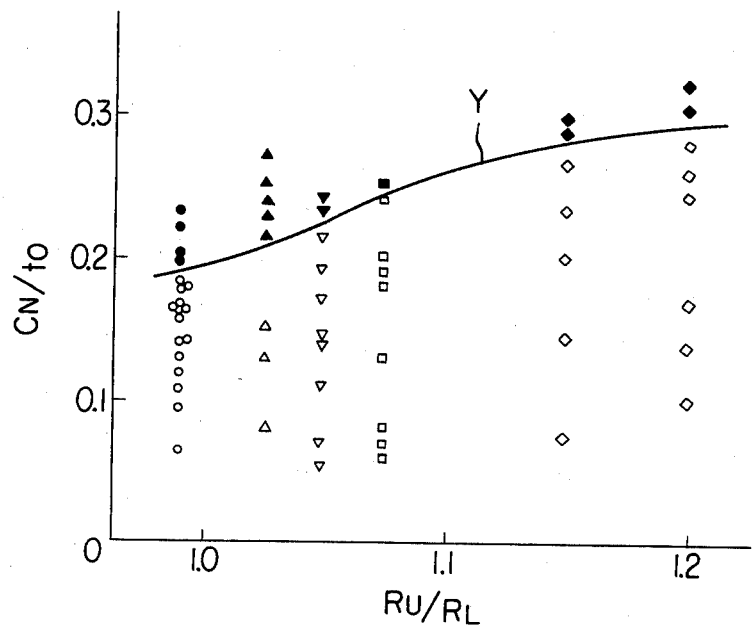
Figure 8:
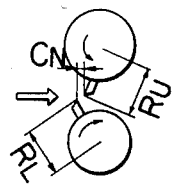
FIGS. 8 and 10 are schematic views illustrating relative dimensions according to the present invention.
Figure 10:
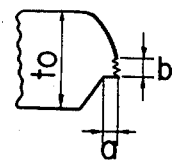

FIG. 9 shows the relationship between the ratio $R_U/R_L$, wherein $R_U$ is the radial distance from the center of rotation of the upper drum to the outer edge of the upper blade, and $R_L$ is the radial distance from the center of rotation of the lower drum to the outer edge of the lower blade, and the ratio $C_N/t_o$, wherein $C_N$ is the clearance between the upper and lower blades upon shearing, and $t_o$ is the thickness of the workpiece to be sheared. FIGS. 8 and 10 illustrate the intended dimensions. In FIG. 9, the region above curve Y represents conditions where the workpiece cannot be sheared, and the region below the curve Y represents conditions where good shearing is obtained. As the ratio $R_U/R_L$ is successively increased, the region of good shearing capability (marginal clearance) becomes broader or greater, and thus the effect of the different circumferential velocities of the outer edges of the blades is particularly clear. However, when the ratio $R_U/R_L$ reaches 1.2 or greater, the curve Y substantially flattens. Thus, there will be no appreciable advantage to be obtained by increasing the ratio $R_U/R_L$ above 1.2.

It is to be noted that the clearance upon shearing $C_N$ is represented as the sum of an initially preset clearance $C_1$ between the upper and lower blades, plus an opening $C_2$ of the blades upon shearing as measured in a non-contact displacement manner. Thus, clearance $C_N$ is intended to mean the clearance between the edges of the blades when they are actually shearing.

FIGS. 11 and 12 respectively evaluate the shearing capability by comparing the ratio of a burr a to the sheet thickness $t_o$ and the ratio of sheared length /b to the sheet thickness $t_o$. Burr a and sheared length b are illustrated in FIG. 10. The abscissae of both of FIGS. 11 and 12 are the above-discussed ratio $C_N/t_o$. FIG. 13 is a chart of the experimental conditions illustrating the data shown in FIGS. 11 and 12. As shown in FIG. 11, for a ratio $R_U/R_L$ of 0.998, a considerable number of burrs are generated, and it will be apparent that when the ratio $R_U/R_L$ is less than 1.02, conditions are not favorable for preventing the generation of burrs. Similarly, with reference to FIG. 12, a large sheared length b indicates that shearing has been well effected. It will be apparent from FIG. 12 that when the ratio $R_U/R_L$ is 1.02 or less, the sheared length is too short with the result that shearing capability is poor.

Figure 14:
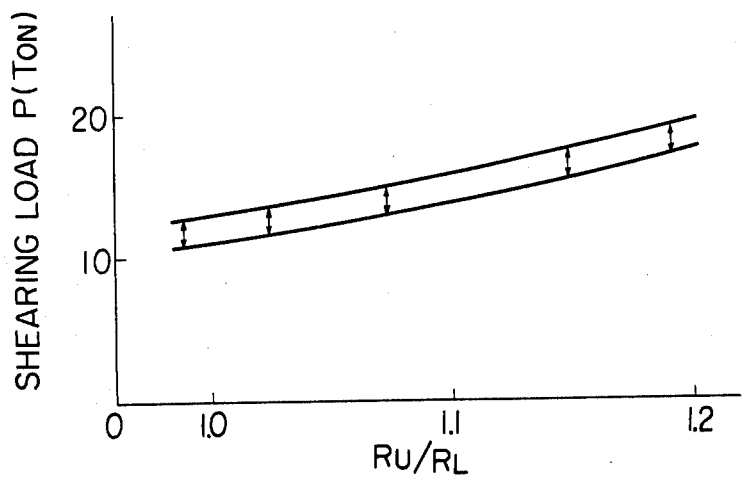
Figure 15:
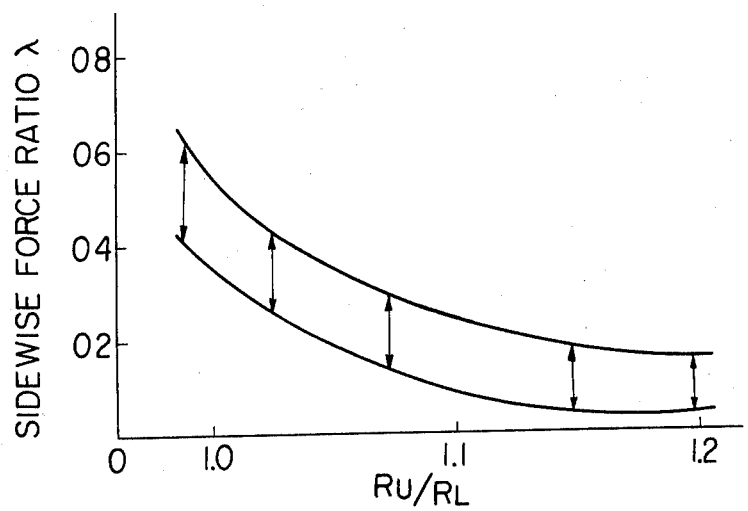

FIGS. 14 and 15 represent the experimental results of loading characteristics. As will be apparent from these figures, when the ratio $R_U/R_L$ is successively increased, the load tends to gradually increase, but the sidewise force ratio $\lambda$ initially falls steeply and then gradually flattens. The sidewise force ratio $\lambda$ is the proportion of the horizontal force generated during shearing versus the vertical load. The smaller is the value of $\lambda$, the less broadening of the blade edge will occur, so that good shearing can be achieved. When the ratio $R_U/R_L$ becomes 1.2 or larger, the sidewise force ratio $\lambda$ becomes substantially constant.

Making a general evaluation of the above described experimental data, the ratio of the circumferential velocities between the outer edges of the upper and lower blades should preferably be in the range of 1.02 to 1.20. That is, it has been established by the above experimental results, that if provision is made such that the circumferential velocity of the outer edge of one blade is greater than the circumferential velocity of the outer edge of the other blade by a factor of from 1.02 to 1.20, then the workpiece can always be properly sheared.

As has been described in detail above, the drum type shear according to the present invention can achieve remarkable improvements in shearing capabilities which could not be realized in prior art drum type shears. This is due to the fact that provision is made that the circumferential velocity of the outer edge of one blade is greater than the circumferential velocity of the outer edge of the other blade during the phase of the cycle of rotation of the drums for shearing the workpiece. Accordingly, it will be apparent that the drum type shear according to the present invention has significant industrial utility.

Although the present invention has been described and illustrated with regard to preferred embodiments thereof, it is to be understood that various modifications may be made to the specifically described structural arrangements without departing from the scope of the present invention.

What we claim is:

1. In a drum shear for shearing a workpiece, said drum shear being of the type including a pair of rotatable drums, each said drum including a longitudinal shearing blade, and said drums being arranged such that upon rotation of said drums a workpiece passing therebetween is bitten between and sheared by said blades, the improvement wherein:

said drums rotate at equal angular velocities;

a first radial distance between the outer edge of a first said blade and the rotational axis of the respective first said drum is greater than a second radial distance between the outer edge of a second said blade and the rotational axis of the respective second said drum, the ratio of said first radial distance to said second radial distance being 1.02 to 1.20, such that the circumferential velocity of said outer edge of said first blade is greater than the circumferential velocity of said outer edge of said second blade; and said first and second drums being rotated by drive means such that at the beginning of an operation of shearing a workpiece said outer edge of said first blade first contacts the workpiece at a first longitudinal position along the direction of movement of the workpiece, said outer edge of said second blade first contacts the workpiece at a second longitudinal position along said direction of movement, and said first longitudinal position is upstream of said second longitudinal position with respect to said direction of movement, thereby defining a gap extending upstream from said outer edge of said second blade, such that during the shearing operation said outer edge of said first blade moves in a direction relative to said outer edge of said second blade to sequentially reduce the size of and eliminate said gap, and such that upon completion of the shearing operation said outer edge of said first blade is downstream of said outer edge of said second blade with respect to said direction of movement.

2. The improvement claimed in claim 1, wherein said first drum is positioned above said second drum.

3. The improvement claimed in claim 1, wherein said second drum is positioned above said first drum.

* * * * *